Aug. 16, 1960     J. P. GLASBY, JR     2,949,255
AIRCRAFT
Filed Nov. 25, 1957
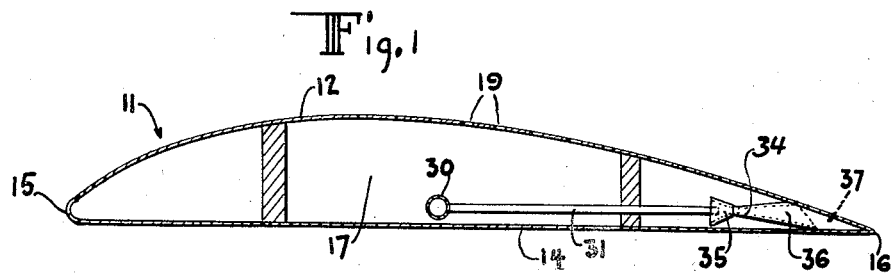
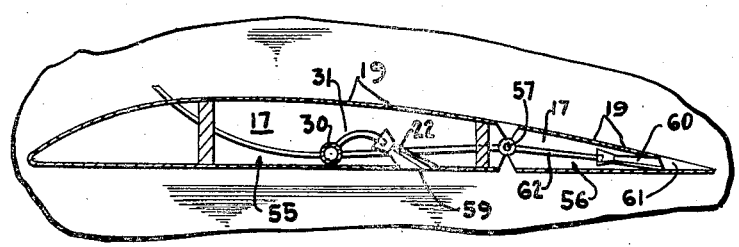
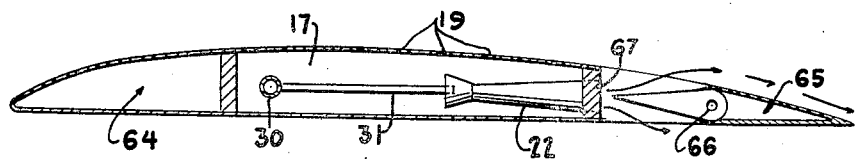
INVENTOR
Jonathan P. Glasby, Jr.
BY
ATTORNEY

United States Patent Office 2,949,255
Patented Aug. 16, 1960

2,949,255

AIRCRAFT

Jonathan P. Glasby, Jr., 29 Mountain Road, Verona, N.J.

Filed Nov. 25, 1957, Ser. No. 698,601

3 Claims. (Cl. 244—42)

The present invention relates to aircraft, and, more particularly to aircraft sustentation.

It has long been recognized that high take-off and landing speeds have been a major factor in contributing to the reluctance of civilians to own and operate private aircraft. It is desirable therefore, that aircraft designed for civilian use have low take-off and landing speeds while having a relatively high cruising speed. In order to decrease the take-off and land speeds of conventional type aircraft, it is necessary to increase the lift of their airfoils. Increased lift can be achieved by increasing the area of the airfoils, however, this also increases the drag of the airfoils and causes an undesirable reduction in the cruising speed of the aircraft. Boundary layer control means also can be used to increase lift, however, previously known boundary layer control means have not been efficient enough to enable aircraft to operate at a substantial reduction in speed. Also, at low speeds the rate of air flow over the control surfaces is decreased and these surfaces tend to lose their effectiveness thereby making it difficult to control the aircraft.

Accordingly, an object of the present invention is to provide in an aircraft means for enabling the aircraft to operate efficiently over a wide range of speeds.

Another object is to provide in an aircraft means by which the total lift of the airfoils may be increased for low speed operation.

Still another object is to provide an improved boundary layer air control system.

A further object is to provide a boundary layer air control system which increases the effectiveness of control members at low speeds.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

Fig. 1 is a sectional view of a wing of an aircraft in accordance with the present invention.

Fig. 2 is a sectional view of an airfoil section having a control member, showing an arrangement for providing increased lift to the control member.

Fig. 3 is a sectional view of an airfoil section having a control member, showing an arrangement for providing increased air flow over the surfaces of the control member.

Referring to the drawings in detail, and more particularly to Fig. 1 thereof, a wing 11 of an aircraft in accordance with the present invention is shown which comprises a curved upper wall or skin 12, a flat lower wall or skin 14 which joins the upper skin 12 at the leading edge 15 and the trailing edge 16 of the wing to define a chamber 17, and an aspirating system. The upper skin 12 is provided with a plurality of openings 19 which may be provided by perforations in an impervious skin or by a section of fabric which is permeable to air.

The aspirating system includes an aspirating device 22 mounted in the chamber 17 within the wing, a main conduit 30 extending longitudinally with respect to the airfoil, and a branch conduit 31 connecting the main conduit 30 to the aspirating device 22.

The main conduit 30 is connected through a control valve (not shown) to an air compressor or to one or more tanks or cylinders of compressed air at 3000 pounds per square inch. Also, it is contemplated that the exhaust gases of a turbine may be utilized as a source of pressure medium.

The aspirating devices 22 comprise a venturi throat 34 having a large diameter inlet 35 and outlet 36. The conduit 31 extends into the inlet 35 and an aperture 37 is provided in the upper wing skin 12 at the trailing edge 16 adjacent the outlet 36.

In operation, to provide for low take-off and landing speeds, the total lift developed by the airfoils is increased by placing the aspirating system in operation to increase the lift of the wing.

To place the aspirating system in an operable condition, the pilot opens the control valve to allow air under pressure to flow through the conduit to the branch conduit 31 from which it issues as a high velocity stream of air into the inlet 35 of the aspirating device 22. This stream of air flow through the venturi throat 34 creates a low pressure area at the inlet 35 which draws the air from the chamber 17 through the throat 34. The decreased pressure created by the withdrawal of air from the chamber 17 causes the air moving over the upper wing surface 12 to be drawn through the openings 19 into the chamber 17. This action increases the rate of flow of the air moving over the upper surface 12, decreases the thickness of the boundary layer air, and prevents turbulence from occurring when the angle of attack of the wing is increased.

Where it is desirable to place an aspirating device in an airfoil section provided with a control member, the lift of the control member also may be increased by the arrangement shown in Fig. 2, or the low speed efficiency of the control member may be increased by the arrangement shown in Fig. 3.

In the arrangement shown in Fig. 2, the airfoil, which may be either a wing or a tail member, is composed of a main section 55 and a control member 56 which is pivoted about a point 57 at the longitudinal junction of the main section and the control member. The main section 55 is provided with an aspirating device 22 positioned in an outlet down attitude and having its outlet coincident with an opening 59 in the lower surface of the airfoil, and the control member 56 is provided with a smaller aspirating device 60 having its outlet in coincidence with an opening 61 in the upper skin of the member. The section 55 is provided with a main conduit 30 and a branch conduit 31, and both the section 55 and the member 56 are provided with a chamber 17 and openings 19 as described hereinabove in connection with wing 11. A flexible conduit 62 provides communication between the main conduit 30 and the aspirating device 60.

In the arrangement shown in Fig. 3, an airfoil, which also may be either a wing or a tail member, comprises a main section 64 and a control member 65 pivotally mounted to the main section at a point 66 on each side of its ends. The section 64 is provided with a chamber 17, openings 19, a main conduit 30, a branch conduit 31, and an aspirating device 22. The aspirating device has its outlet in coincidence with a hole 67 formed in the rear wall of the section 64 directly in front of the control member so that the air issuing from the aspirating device passes over the surfaces of the control member increasing their effect.

From the foregoing description, it will be seen that the present invention provides in an aircraft improved means, including an improved boundary layer air control system, for varying the lift and drag of the airfoils and increasing low speed control, enabling the aircraft to operate efficiently over a wide range of speeds.

As various changes may be made in the form, construction and arrangement of the parts herein, without departing from the spirit and scope of the invention, and without sacrificing any of its advantages, it is to be understood that all matter herein is to be interpreted as illustrative and not in any limiting sense.

I claim:

1. In an aircraft, the combination of an airfoil having a main portion and a control member portion, said portions each being provided with a chamber and each having an upper surface provided with openings in fluid flow communication with said chamber, a first aspirating device having an inlet in fluid flow communication with said main portion chamber and having an outlet in fluid flow communication with the atmosphere, a second aspirating device having an inlet in fluid flow communication with said control member portion chamber and having an outlet in fluid flow communication with the atmosphere, and conduit means connected to said aspirating devices and adapted to be connected to a source of pressurized gas, whereby the lift of both of said airfoil portions is increased when said aspirating devices are in operation.

2. The combination according to claim 1, wherein said main portion of said airfoil has a lower surface provided with an air outlet opening and said outlet of said first aspirating device is positioned at said air outlet opening.

3. The combination according to claim 1, wherein said conduit means includes a main conduit within said main airfoil portion and a flexible branch conduit connecting said second aspirating device to said main conduit.

References Cited in the file of this patent

UNITED STATES PATENTS

| | | |
|---|---|---|
| 1,310,389 | Cerruti | July 15, 1919 |
| 2,071,744 | Anathor-Henrikson | Feb. 23, 1937 |
| 2,585,676 | Poisson-Quinton | Feb. 12, 1952 |